Feb. 28, 1967  M. W. DOLPHIN  3,306,273
FUEL VAPORIZER

Original Filed Nov. 19, 1963  2 Sheets-Sheet 1

INVENTOR.
MAYNARD W. DOLPHIN
BY R. Washburn
HIS AGENT

United States Patent Office 3,306,273
Patented Feb. 28, 1967

3,306,273
FUEL VAPORIZER
Maynard W. Dolphin, 844 Hackett St.,
Beloit, Wis. 53511
Continuation of application Ser. No. 324,784, Nov. 19, 1963. This application Dec. 10, 1964, Ser. No. 418,949
4 Claims. (Cl. 123—133)

This application is a continuation of my earlier filed copending application, Serial No. 324,784, filed November 19, 1963, which is now abandoned.

This invention relates to methods and apparatus for supplying fuel to internal combustion engines. More particularly the invention provides a method and means for generating and delivering gaseous-fuel unmixed with air to the combustion space of an internal combustion engine and only therein for mixing the gaseous fuel with combustion air separately introduced.

In a companion application, Serial No. 419,278, now Patent 3,198,181 filed of even date herewith, is disclosed an internal combustion engine particularly adapted for use with the herein disclosed gaseous fuel supply method and apparatus.

It has been repeatedly proposed in the prior art to introduce into the combustion chamber of an internal combination engine a heated mixture of air and fuel. Almost invariably these proposals have been based upon a misunderstanding of the effect which this has upon the thermal conditions in and on the volumetric efficiency of the engine. Many of these schemes, if workable at all, would be intolerably inefficient and none, so far as is known, have attained any degree of practical utility. It has been recognized that advantages might be obtained by fueling an internal combustion engine with gas, principally upon the premise that gases may be more equitably distributed by simple means to the several cylinders of an internal combustion engine.

The putative advantages of distribution of gas to the cylinders of an engine do not obtain when the mixture are variable in density or in multiple phase, which is to say, combinations of gas and liquid.

It has been taught, for example in the literature, viz, "Internal Combustion Engines" by Lester C. Lichty, Mc-Graw-Hill, 1939, New York, page 275, that complete evaporation of fuel would enhance distribution but would result in higher mixture temperatures with lower volumetric efficiency and lower power output from the engine.

On the other hand, many patentees have proposed partially heating fuel, or dispersing liquid fuel without heating, thus, providing mixtures of gas and liquid with or without combustion air for delivery into combustion engines. There are other similar contradictions to be found in the teachings of the prior art.

Except for diesel and similar engines employing straight liquid injection, practical engines in common use today employ carburetors, devices for mixing into the air stream of aspiration engines, liquid fuel in finely divided form to be conveyed into the combustion space by the inspiration of the combustion air. Despite the present high state of development of such carburetors these have many faults and shortcomings that are well known.

Mixtures of liquid, however finely divided, and air tend to be erratic in quality and unpredictable in flow characteristics and therefore render difficult the control of rate of fuel flow and the equitable distribution of mixture to the several cylinders. The evaporative cooling effect of the liquid-air mixture is, however, recognized as beneficial in somewhat lowering cylinder temperatures and in its cooling effect on entering air.

It is, therefore, an object of the instant invention to overcome certain limitations and to resolve certain contradictions of the prior art.

A further object is to provide a method and apparatus for the generation and delivery of gaseous fuel to an internal combustion engine without loss in volumetric efficiency.

A further object is the provision of relatively uniform density of gas whereby the rate of fuel delivery to the engine may be more precisely controlled.

A further object of the invention is to provide an alternative for conventional carburetors and for solid liquid injection devices.

The foregoing and other objects, features, and advantages, will become apparent or be explicitly set forth in the following description together with the accompanying drawings.

Figure 1:
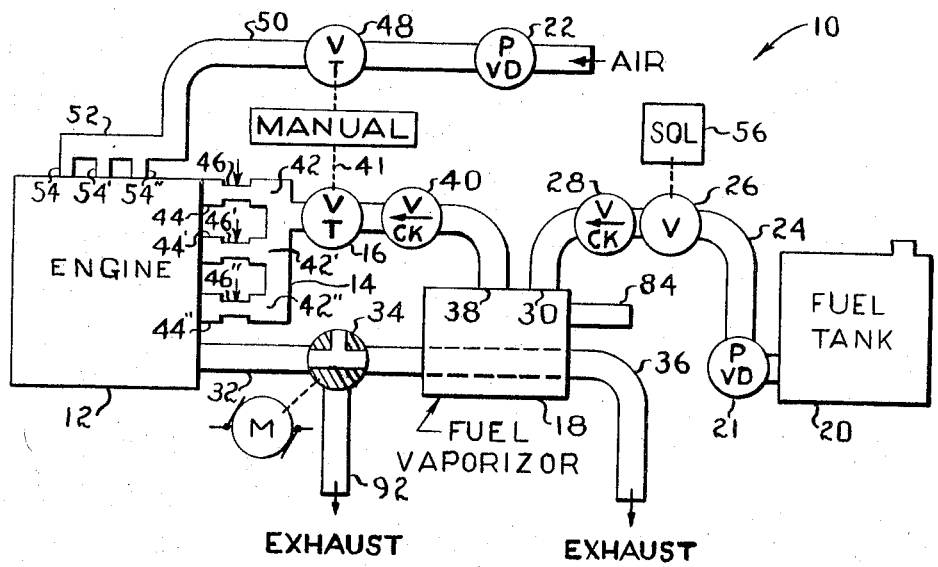
FIGURE 1 depicts schematically a flow diagram of the fuel system of the instant invention.

FIGURE 1 shows in schematic form the system of fueling of the instant invention. A significant feature is the separate delivery to the engine of combustion air and fuel. The two are not mixed until delivered into the engine, preferably within the cylinder itself.

Generally the system 10 to be described comprises an engine having a manifold or gas distribution unit 14, a throttle 16, a gas generating unit 18, a liquid fuel tank 20, pump 21, and blower 22. The system is preferably supplied with fuels which remain liquid at ordinary atmospheric pressure and temperature. Such fuels are widely available and more easily handle than the liquified petroleum gas, LPG, or similar fuels. The fuel pump 21, may be any of the known types; preferably it should be equipped with relief valve providing bypass recirculation. The pump 21 will be required to deliver fuel at higher pressures than usually employed in connection with carburetors.

Liquid fuel from tank 20 is delivered by pump 21, via fuel line 24 through two-way valve 26 and check valve 28 into the inlet 30 of gas generator 18, which will be described in detail in connection with FIGURE 2.

Waste heat from the engine 12, which heat may be conveyed either by exhaust gases or by engine cooling fluid, flows through conduit 32 and three-way valve 34 to the gas generator 18, supplying thereby sensible heat, and more significantly, the latent heat of vaporization to the liquid fuel within the generator 18.

Having delivered heat to the liquid fuel within the gas generator 18, exhaust gases are discharged through duct 36. Where liquid engine coolant is preferred, obviously, duct 36 will return the flow to the engine water jackets (not shown).

Within gas generator 18, the waste heat from the engine vaporizes liquid fuel to a dense gaseous state, i.e., gas at elevated pressure, the vaporizing chamber being designed to contain gas at superatmospheric pressure. As is well known a liquid and its gas do not acquire "superheat"; the gas being dry or in partial mixture with liquid. Pressure within the gas generator 18 is generated and maintained above the pressure desired for delivery into the engine 12.

Sufficiently high pressures are generated within the generator 18, that the gaseous fuel can be introduced into an engine 12, during the first half of its compression stroke. This is of particular advantage in the two stroke cycle engine, since it permits maximum duration of power stroke and more complete scavenging prior to the admission of fuel.

As dictated by the opening of throttle valve 16 gas moves through outlet 38 of the gas generator 18, passing through check valve 40. So doing, the gas expands, undergoing a slight pressure drop thereby becoming dry, due to the resistance in check valve 40. The quantity of gaseous fuel required to suit the engine load is regulated by the opening of throttle valve 16.

Linkage, indicated by the line connection 41, serves to relate fuel and air flow rates in desired ratio. The now dry gas flows into manifold 14 for distribution to the several cylinders of engine 12. As previously indicated dry gas at elevated pressure is more amenable to equal distribution. Manifold 14, therefore, is of relatively simple construction and requires only the well known area reduction in the flow direction. Outlets 42, 42′, 42″ . . . receive delivery tubes 44, 44′, 44″ . . ., of substantially equal flow characteristics, i.e., transverse area, length, and resistance to flow. Each of tubes 44 . . ., have flow regulating orifices or needle valves 46, 46′, 46″ . . ., (shown in FIGURE 2). These valves 46, have adjustably fixed flow capacity and are employed to ensure delivery to each cylinder precisely equal charges, or flow rates, of the dense dry gaseous fuel. Expansion of gas through such devices also creates desired turbulence in the gas delivered to the engine 12.

As previously noted, the instant invention contemplates the delivery of air for combustion separately from the gaseous fuel. To this end, blower 22 is provided, driven either by the engine 12, or by independent means. Blower 22, may be of any design, but preferably is a positive displacement type, having capacity for combustion air, and for scavenging air as well, at pressures significantly above atmospheric. From blower or air pump 22, air delivery to the engine 12 is regulated by a throttle valve 48. Other means, such as variable speed drive, intake throttling, or bypassing may be used depending upon the class or type of blower selected.

A linkage 41 is shown schematically connecting the fuel throttle valve 16 to the air control throttle 48. Specific characteristics of the throttle valves used necessarily determine the dimensions of the linkage. As will be apparent to those skilled in the art the linkage need only be proportioned to the desired fuel-air ratio so that the resulting mixture ratio within the cylinder will be held within the desired limits at any throttle position.

Compressed air flows from the blower 22, via duct 50 to a manifold or header 52, which has outlets 54, 54′, 54″ . . ., communicating with each of the several cylinders of engine 12.

An advantage of this invention is that blower 22 supplies air into the engine 12 at considerable pressure. Engine cylinder pressures during the compression and power strokes are quite high. During the first third of the compression and the last third of the power stroke, i.e., approximately 57° thereafter cylinder pressure is considerably reduced and useful energy output is at a minimum. During this period air may be admitted by suitable valve timing, both for scavenging the burnt gases and for introducing combustion air under pressure. Valves may be set to interrupt or admit air entry as cylinder pressure increases to, or decreases to the pressure made available by the blower 22.

It will be appreciated that engine 12, being capable of diverse forms and modifications is shown schematically.

Figure 2:
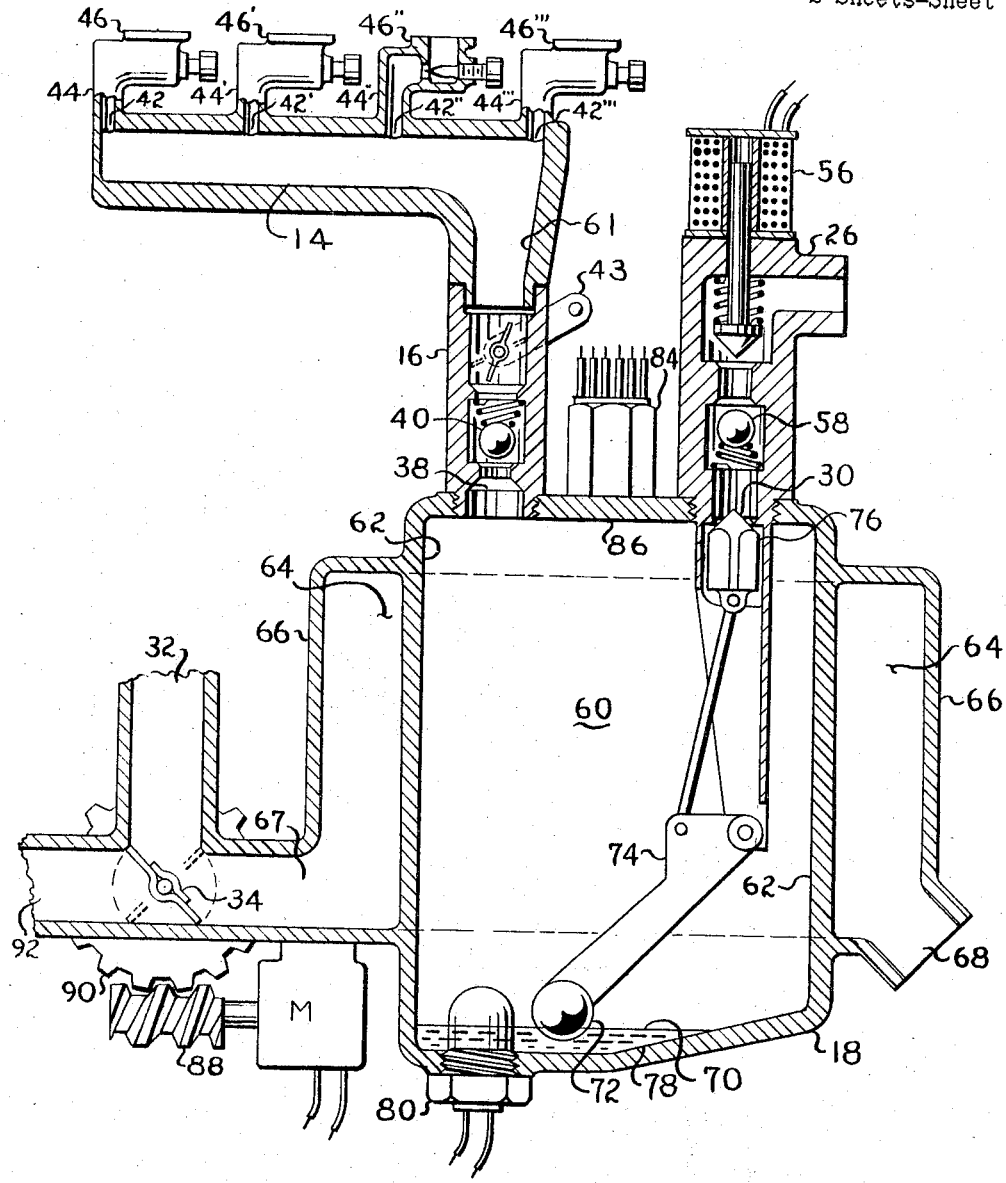
FIGURE 2 shows the fuel vaporizing chamber in elevation, sectioned to facilitate description of certain features.

In FIGURE 2, the gas generator 18 is shown in greater detail to enable fuller appreciation of its structure and function. Liquid fuel at relatively high pressure, from pump 21 (FIGURE 1) enters the gas generator 18 through two way solenoid operated valve 26. Control of the solenoid 56 will be discussed later herein.

The check valve 58 is intended primarily for safety purposes, to prevent the accidental return flow of vapor into the fuel pump or liquid lines.

The vapor generating chamber 60 may, of course, take any form and practical size. The size of the vapor chamber 60 must be a compromise: larger size will produce a greater gas generating capacity, a smaller size will accomplish a greater degree of flexibility of control over the rate of vaporization. The wall 62 forming the enclosed chamber is required to have sufficient strength to resist internal gas pressures which may range up to the design mean-effective-pressure of the associated engine, although lower pressures will be more commonly practiced.

Surrounding the chamber wall 62 is an annular flow passage 64, enclosed in turn by the outer wall 66 of the generator 18. The flow passage 64 is provided with an inlet 67 and an outlet 68 through which exhaust gases conveying waste heat from the engine may be conducted. Alternatively, the flow passage 64 may be connected to receive engine coolant, usually water, as a means of conveying waste heat to the fuel gas generator 18. A further requirement, therefore, for the wall 62 defining the gas generating chamber 60 is that it provide for good heat transfer from the heating fluid to the liquid fuel. It is also desirable that the wall 62 have low heat storage capacity to minimize the time lag in control of the gas generating rate during a change in load or in speed of the associated engine.

In certain respects the gas generator 18 resembles a still or boiler; a generally fixed liquid level 70 is maintained by a float 72 and lever system 74 which controls float valve 76. The float system 72, 74, 76 is designed to override the liquid fuel pressure causing pump 21 to recirculate if necessary. Liquid level 70 is preferably slightly below or otherwise removed from direct exposure to wall 62 where heat is received from passage 64. In this manner more uniform temperature and less "spot heating" are achieved. Floor 78 may be flat, as shown, or concave to provide greater depth of liquid for float operation. An auxiliary heater 80 is immersed in the liquid fuel, access being provided in floor 78. In normal operation much of the vaporization will take place as liquid fuel courses down the side-wall before reaching a pool of liquid in the bottom as shown in FIGURE 2. Indeed evaporation from the warm wall surface 62 of the chamber 60 may be enhanced by extending the path distance over which the liquid fuel must flow before reaching the bottom and numerous means for accomplisihng this will be immediately apparent to those skilled in the art.

From the generating chamber 60 the outlet 38 receives therein a check valve 40 permitting outward flow but preventing accidental back-flow from the engine. The dry gas delivered from the chamber 60 flows through the throttle valve 16 by which the rate of gas flow is regulated, into a riser 61 which is in turn connected with a distribution manifold 14. The manifold 14 has a number of outlets 42, 42′, 42″ . . ., corresponding to the number of cylinders of the engine being served by the gas generating system.

From the manifold the dry dense gas is conducted to each engine cylinder by delivery tubes 44, 44′, 44″ . . ., each of which is connected to one of the manifold outlets 42. Through the tubes 44, gas passes either directly into the engine cylinders or to anti-chambers controlled by engine valves (not shown).

One of the features of this invention, permitted by the fact that the fuel is delivered in dry dense gaseous state is an adjustable choke or orifice of needle valve 46, 46′, 46″ . . ., in each of the gas delivery tubes 44. By this means the advantages of more equitable distribution of fuel in gaseous form is further improved by a precise adjustment of each of the orifices so that the quantity of gas delivered to each cylinder is made exactly equal to the quantity delivered to any of the other cylinders despite the inevitable inequalities in a manifold system resulting at differing rates of flow. Needle valves 46 may be adjusted to "tune" the cylinders of a particular engine for smooth, uniform and equal performance. Orifice plates or nozzle jets of preselected size and flow capacity may be substituted for the needle valve. The sizes thereof are most usefully selected after flow measurement as by inference from the position of the needle valve stem.

Figure 3:
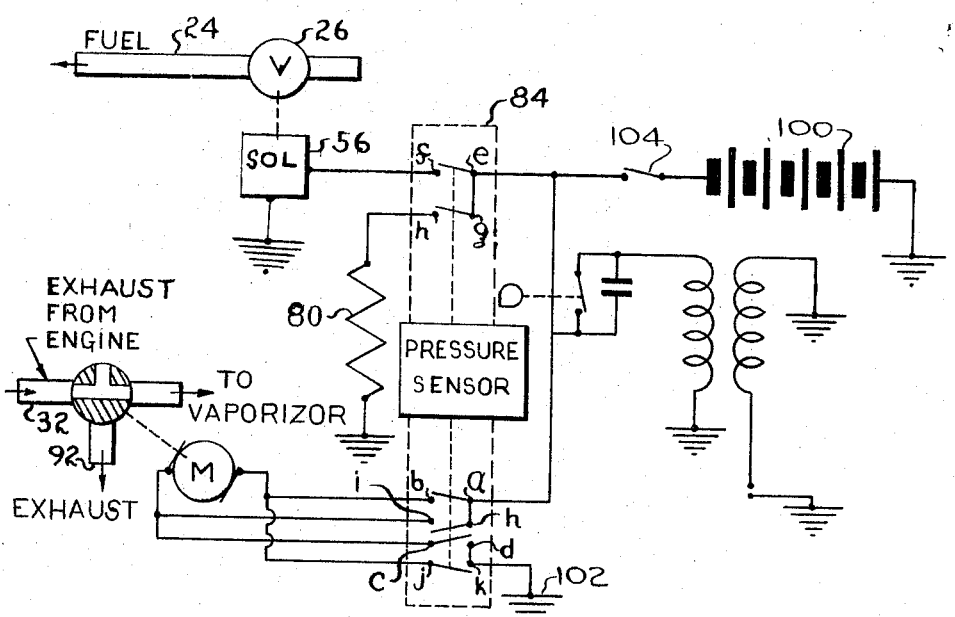
FIGURE 3 is a diagram of the control circuits.

FIGURE 2 further shows with reference also to FIGURE 3, three-way valve 34 by which the exhaust gases supplying heat to generator 18 are controlled. A pressure responsive switch 84 is mounted in the top wall 86 of gas generator chamber 60. Pressure within the chamber 60 below a predetermined minimum, or "low," closes a first circuit, in switch 84 connecting battery 100, via contactors a-b-M-c-d to ground 102, energizing motor M, driving worm 88 and worm wheel 90 to the position shown in FIGURE 2. Valve 34, in the position shown admits hot engine gases from conduit 32 into entry 67 of flow passage 64. Also on the "low" pressure condition switch 84 makes contacts e-f energizing solenoid 56 to open inlet valve 26. Similarly, contacts g-h energize heater 80.

At or above a predetermined maximum, or "high," pressure, switch 84 breaks the contacts made in "low" pressure, and makes h-i-M-j-k, thereby reversing motor M, worm 88, gear 90, to shift three-way valve 34 so as to connect conduit 32 with exhaust pipe 92. By selecting "low" and "high" pressures suitable to the fuel used, substantially constant pressure of gaseous fuel is maintained within chamber 60 for delivery as previously described. Temperature responsive switching may be used, if desired, in place of the pressure switch 84.

Inasmuch as numerous positioning devices for operating three-way valves, as well as such valves themselves, are well known, the valve 34 and motor M are shown only schematically for simplicity.

The gas pressure within the chamber 60 may be temporarily reduced by an increased demand for fuel due to increased load and throttle opening; the gas pressure within the chamber 60 may also reduce as a result of a reduction in the heat available for vaporization. In the former case it is desired to introduce additional liquid but in neither case to overfill the chamber. For this reason a float valve 76 is positioned to respond to the level 70 of liquid in the chamber 60 so as to close valve 76 should the liquid level 70 exceed a preset amount.

In FIGURE 3, a diagram of the control circuits previously referred to shows a conventional battery 100, a main, or starting switch 104. A conventional ignition circuit is shown for the sake of completeness, but is too well known to make its description necessary.

If desired, a manual switch may be added to remove the heater 80 from service during normal running of the engine 12.

As has been mentioned, the admission of gas into the combustion space of an internal combustion engine represents a reduction in the volumetric efficiency of the engine inasmuch as the gas occupies considerably more space than would be occupied by the same weight of liquid fuel. Two features of this invention tend to cancel this effect. First, gas is introduced to the engine at superatmospheric pressure, the gas thus being introduced in a dense dry gaseous state. This, it will be apparent, offsets a considerable degree the volumetric difference.

Secondly, the system employs compressed air from the blower preferably generally equal to but slightly less than the pressure provided for the dense gaseous fuel. The weight of combustible mixture thus introduced into the combustion cylinder is at least as great and preferably is significantly greater than the equivalent charge in an aspiration engine. While it is, of course, obvious that this increase in "volumetric efficiency" is not achieved without the expenditure of power, a considerable net gain in engine output is hereby achieved. One of the features of this invention, when associated with a two-cycle engine, is an ability to extend the power stroke in duration and average pressure to much more nearly approach the ideal of twice the power available from the equivalent four-cycle engine.

The terms gas, and vapor, are used interchangeably herein despite the recognition of certain sometimes used technical distinctions. These distinctions are not material to the invention since fuels presently contemplated may be vaporized and handled as dense gas and generally behave so as not to fall clearly into either specific definition. As is well known, only gas "burns"; liquids and solids must first be converted to gaseous state before combustion can take place. The practical fuels generally will be found to belong to the class of hydrocarbons including the gasoline, kerosene, various lighter distillates, even certain alcohols. Any liquid fuel having practical quantity of heat units which can be vaporized at reasonable pressures can be burned. Preferably, though not necessarily, fuels should be chosen which have distillation ranges of approximately 50° F. or less. It will be apparent to those skilled in the art that fuel blends which distill at widely separated temperatures will tend, in the gas vaporization chamber of the invention, to distill fractionally and leave unvaporized the heavier fractions, particularly during light loads or idling. It is also desirable to avoid fuels having free carbons and resinous materials which will tend to deposit on the warm walls of the vaporizing chamber.

Such features and steps of the operation which may not already be apparent from the foregoing description are as follows:

In starting the engine 12, the main, or ignition, switch 104 is turned on, supplying electric energy immediately to the auxiliary heater 80. Inlet valve solenoid 56 is also energized to open valve 26 and if fuel is required in the chamber 60, it is admitted by the float valve 76. The throttle 16 being closed, pressure builds rapidly within the chamber 60 and the dense gaseous fuel flows, as the throttle 16 is opened, out through the check valve 40, through the throttle 16 into the riser 61 connecting to the manifold 14 and thence through the delivery tubes 44 to the respective cylinders of the engine 12. The blower 22, started simultaneously, either by cranking or by independent drive means, delivers pressurized fresh air to the engine 12, the two throttles 16 and 48 being coordinated by the linkage 42 as previously described. Gas pressure within the chamber 60 continues to increase at a rate determined by the engine load and fuel demand until pressure switch 84 is activated. The signal from the pressure switch transmitted to liquid fuel inlet valve 26 and flow passage valve 34 commands both to close for a period depending upon fuel and heat rates of flow. With flow in the heat fluid passage 64, decreasing the gas pressure within the chamber 60 tends to drop to the preset lower limit of pressure at which point the pressure switch 84 again signals, this time opening the liquid fuel inlet valve 26 and the heat flow passage valve 34.

Both inlet valve 26 and the heat fluid passage valve 34 means have been described, as "ON-OFF" devices. It is apparent that modulating pressure sensing means and valve controls may be applied to either or both inlet valve and heat passage valve.

From the foregoing description and the drawings it will be apparent that I have provided a method of furnishing combustible fuel mixture for an internal combustion engine and apparatus for supplying airless dense gaseous fuel to such engine which meets the objects declared and provides the features and advantages desired. I have set forth in the foregoing description the best mode presently known to me of putting my invention into practice. I have indicated certain equivalent constructions and others will be apparent to those skilled in the art as being suitable in the practice of my invention. I do not desire to be limited to the exact details of construction shown or described but only as particularly pointed out and distinctly claimed below.

I claim:

1. A fuel vapor generator comprising in combination means defining an enclosed gas pressure retaining chamber, means defining with said first means a flow channel receiving a fluid containing engine waste heat and conducting said fluid in heat exchange relation with said chamber and releasing said fluid to ambient atmosphere, regulating means responsive to the pressure within said chamber, fluid flow control means in said flow channel controlling the rate of flow of fluid in said channel, said flow control means being regulated by said regulating means, a valve controlling the admission of liquid fuel into said chamber, means responsive to the quantity of liquid fuel within said chamber commanding said valve, gas outlet means in said chamber, and throttle means for regulating the delivery of dense airless gas generated within said chamber.

2. An apparatus for supplying fuel for an internal combustion engine including a manifold having a plurality of delivery tubes and an inlet, means for delivering airless dense gaseous fuel into the combustion space comprising means defining an enclosed gas generating chamber having an inlet and outlet in flow communication with said manifold inlet, a source of liquid fuel supplying same into said chamber inlet under pressure, heat supply means in heat exchange relation to said chamber, comprising a passage surrounding the gas chamber and having a common wall therewith receiving fluid borne waste heat therethrough from the engine and yielding heat directly to fuel within the gas chamber, and means directly responsive to dry gas fuel pressure within said chamber, controlling said heat supply means, and an electrically operating control device controlling the heat supply means in response to the pressure within the dry gas fuel chamber.

3. In an apparatus for supplying fuel for an internal combustion engine including a manifold having a plurality of delivery tubes of substantially equal flow characteristics and an inlet, means for delivering airless dense gaseous fuel into the combustion space comprising means defining gas generating chamber having an inlet and an outlet in flow communication with said manifold inlet, and an adjustably fixed capacity flow device in each of said delivery tubes.

4. Apparatus for supplying airless dense gaseous fuel to an internal combustion engine at superatmospheric pressure comprising a plurality of gas delivery tubes of substantially equal flow characteristics a manifold having an inlet and a plurality of outlets each connected to one end of each of said tubes, means defining an enclosed gas generating chamber having an inlet and an outlet, said outlet being connected to said manifold inlet.

wall means defining a flow passage in heat exchange relation with said generating chamber said passage being in flow communication with fluid containing waste engine heat, valve means in said chamber inlet, a source of liquid fuel supplying liquid fuel to said chamber at superatmospheric pressure, means responsive to the quantity of liquid fuel in said chamber admitting liquid fuel only when said quantity is less than a predetermined quantity, means controlling the flow quantity of said engine waste heat fluid, and means responsive to the pressure in said chamber in command of said flow control means.

References Cited by the Examiner

UNITED STATES PATENTS

| 1,323,264 | 12/1919 | Gerli et al. | 123—133 X |
| 2,285,905 | 6/1942 | Cunningham et al. | 123—133 |
| 2,780,209 | 2/1957 | Renken | 123—120 X |

MARK NEWMAN, *Primary Examiner.*

A. L. SMITH, *Assistant Examiner.*